UNITED STATES PATENT OFFICE.

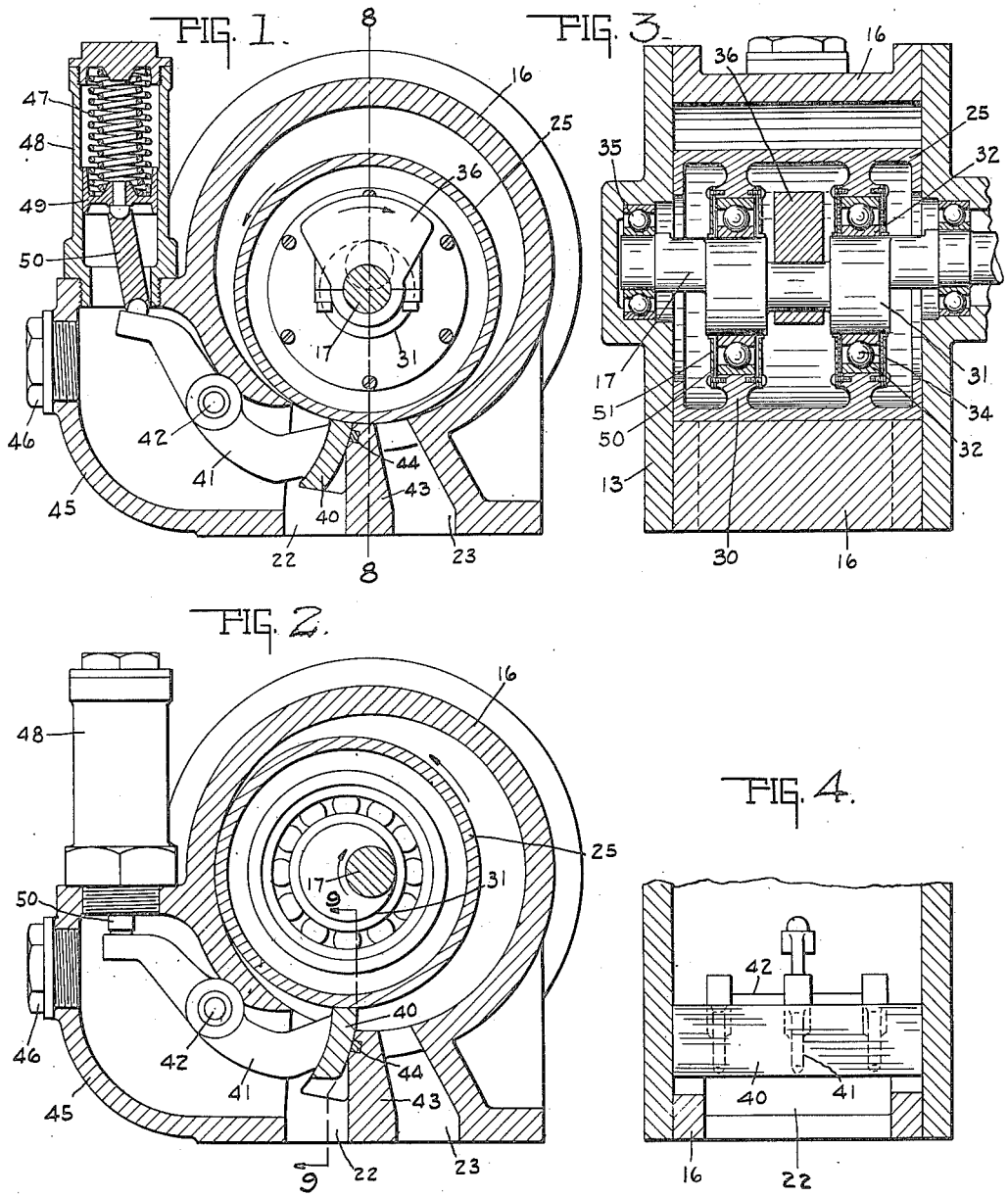

WALTER W. BLACKMAN, OF INDIANAPOLIS, INDIANA, ASSIGNOR TO G. A. COATS MACHINE COMPANY, OF INDIANAPOLIS, INDIANA.

ROTARY PUMP.

1,363,451.  Specification of Letters Patent.  Patented Dec. 28, 1920.

Application filed April 28, 1919. Serial No. 293,230.

*To all whom it may concern:*

Be it known that I, WALTER W. BLACKMAN, a citizen of the United States, and a resident of Indianapolis, county of Marion, and State of Indiana, have invented a certain new and useful Rotary Pump; and I do hereby declare that the following is a full, clear, and exact description thereof, reference being had to the accompanying drawings, in which like numerals refer to like parts.

The object of this invention is to improve the construction of rotary pumps in order to increase the efficiency and diminish the energy, and to permit it to be operated at variable speeds, according to the pressure or pumping capacity desired. The ordinary centrifugal or rotary pump must be rotated at a substantially fixed or set speed, and a very high speed in order to maintain any appreciable efficiency. The pump set forth herein always utilizes all the horse power put in it, whether at slow speed or high speed, and therefore it attains a maximum efficiency.

One feature of this invention consists in providing a cylindrical casing, in which a cylindrical piston of less diameter is loosely mounted eccentrically on the driving shaft, and so that the piston at one point will always be held in frictional engagement with the inner wall of the cylinder and travel thereon in one direction as the shaft operates in the opposite direction. By providing a yielding gate on the casing adapted always to engage the periphery of the piston, it thus renders it possible to have the inlet and outlet ports adjacent each other. Such close proximity of the ports to one another makes the percentage of leakage or by-pass very small in its maximum, so that the pump can be operated at variable speeds to secure a very high or low pressure as desired.

The full nature of the invention will be understood from the accompanying drawings and the following description and claims.

Figure 1 is a view showing the piston and gate actuating means in section. Fig. 2 is the same as Fig. 1 with the piston in another position and the gate actuating means in elevation. Fig. 3 is a section on line 8—8 of Fig. 1. Fig. 4 is a section on the line 9—9 of Fig. 2 with parts omitted.

There is shown herein a pump mechanism 13 in which there is secured a stationary cylindrical casing 16. A driving crank shaft 17 extends therethrough, which is driven by a pulley or any well known driving means not shown herein.

As illustrated in Fig. 1, the cylindrical casing 16 has a flat inlet 22 and a flat outlet 23 at the bottom and adjacent each other. Within the cylindrical casing 16 there is a rotary piston 25 of less diameter than the casing, see Figs. 1, 2 and 3, mounted on a crank shaft 17, loosely and eccentrically, so that it will on one side always be held in rolling contact with the inner wall of the casing, as shown in Fig. 1. The width of the piston is such as to cause it to fit snugly transversely of the casing and engage the side walls thereof with a water tight fit.

The construction of said piston and means for mounting it are illustrated in Fig. 3. The piston 25 is hollow and has a pair of inwardly extending annular ribs 30. Each of said ribs 30 surround an eccentric or crank shaped portion 31 of the crank shaft, and these members carry ball races 32 and 33 respectively for the ball bearings 34, substantially as shown. The shaft is also mounted in the pump casing on the ball bearings 35. The size and shape of the eccentric portion 31 of the crank shaft are such as to cause the piston 25 to roll or travel so as to bear tightly against the inner wall of the pump casing. The crank shaft has a guide 36 secured thereon to counterbalance said eccentric portion 31. A gater 40 extends transversely of the crank pump as shown in Figs. 2 and 4 and operates in the inlet port 22 so as to be held against the periphery of the piston at all times. This gate is secured to a lever 41 which is fulcrumed between its ends on a pivot 42 and the gate 40 is curved concentrically with said fulcrum, and the outer or convex surface thereof bears against the partition 43 between the inlet and outlet ports 22 and 23 and against the packing 44 embedded in said partition, so as to make a water tight joint. The gate therefore is very close to the outlet port 23.

The lever 41 operates in an extension 45 rendered accessible by an opening, closed by the nut 46, and said lever is actuated so as to hold the gate against the rotating piston by the springs 47 in the spring chamber 48, which bears against a piston 49 which actuates the connecting rod 50 and is pivotally connected with the outer end of the lever 41.

In operation when the crank shaft turns in the direction shown by the arrow in Fig. 2 the piston 25 will rotate much more slowly, say one eighth as fast in the opposite direction as indicated by the arrow in Fig. 2 by reason of the rolling contact with the cylinder 16, and the piston will travel in the same direction as the crank shaft rotates. Thus starting with the position shown in Fig. 2 the fluid is sucked through the port 22 and the inlet chamber to the left of the gate 40 being equal to or as large as the outlet or exhaust chamber to the right of the gate, the fluid will be sucked in to the left hand chamber and pumped out of the right hand chamber simultaneously.

One revolution of the piston from the position shown in Fig. 2 will bring it to the position shown in Fig. 1, where the gate is pushed to its outermost limits, and both ports are simultaneously closed and the receiving chamber has reached its maximum. Further travel of the piston will return it to the position shown in Fig. 2 where the discharge chamber has reached substantially its maximum limit, and the fluid is beginning to discharge, while the fluid is just beginning to enter the receiving chamber on the other side of the gate.

The foregoing outlined mode of operation or process is repeated. As the piston travels and is in contact with the casing, the receiving chamber becomes a suction chamber and draws in the fluid while the piston forcibly expels the water from the discharging chamber.

The chief claim of efficiency in this pump is based on the fact that the ports, both inlet and exhaust, are in such close proximity to one another that the percentage of leakage or by-pass is so small at its maximum that the pump can be operated at variable speeds to secure a very high or low pressure, as desired and realizes the full benefit of the horse power employed in driving it.

In order to prevent water, which may seep through the inside of the piston, from entering the bearings upon which the piston ride and retain grease packing therein, the felt washers 50 are on each side of the bearings and secured thereon by the metal washers 51, as shown in Fig. 3. It will also be understood that the piston will roll smoothly over the intake and exhaust ports on that portion of the casing 16 which extends inwardly on either side of said ports as shown in Fig. 3 so as to provide a smooth continuous movement of said cylinder.

The invention claimed is:

1. A rotary pump including a stationary cylindrical casing, a driving crank shaft mounted concentrically therein with a pair of eccentric bearing portions forming a part thereof, a rotary piston within said casing of less diameter than the casing and having two annular inwardly extending ribs surrounding the eccentric portion of the crank shaft, and bearings mounted between said shaft and ribs upon which said piston revolves.

2. A rotary pump including a stationary cylindrical casing, a driving crank shaft mounted concentrically therein with a pair of eccentric bearing portions forming a part thereof, a rotary piston within said casing with its ends abutting against the ends of the casing and of less diameter than the casing and having two annular inwardly extending ribs surrounding the eccentric portion of the crank shaft, and bearings between said ribs and the eccentric portions of the shaft so as to loosely carry the piston thereon in rolling contact with the casing, and means on said bearings for retaining grease therein.

In witness whereof, I have hereunto affixed my signature.

WALTER W. BLACKMAN.